(12) United States Patent
Steiner et al.

(10) Patent No.: US 11,040,582 B2
(45) Date of Patent: Jun. 22, 2021

(54) TIRE MONITORING SYSTEM AND METHOD

(71) Applicant: Infineon Technologies AG, Neubiberg (DE)

(72) Inventors: Christoph Steiner, St. Margarethen (AT); Ralf-Rainer Schledz, St. Margarethen (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/551,123

(22) Filed: Aug. 26, 2019

(65) Prior Publication Data

US 2019/0375254 A1    Dec. 12, 2019

Related U.S. Application Data

(63) Continuation of application No. 14/739,595, filed on Jun. 15, 2015, now Pat. No. 10,449,811.

(51) Int. Cl.
*B60C 23/04* (2006.01)
*B60C 19/00* (2006.01)

(52) U.S. Cl.
CPC .......... *B60C 23/04* (2013.01); *B60C 23/0484* (2013.01); *B60C 23/0488* (2013.01); *B60C 2019/004* (2013.01)

(58) Field of Classification Search
CPC . B60C 23/04; B60C 23/0484; B60C 23/0476; B60C 23/0477; B60C 23/0488; B60C 2019/004
See application file for complete search history.

(56) References Cited

U.S. PATENT DOCUMENTS

| | | | |
|---|---|---|---|
| 5,825,286 A | * | 10/1998 | Coulthard ............... B60C 23/00 340/447 |
| 6,281,787 B1 | | 8/2001 | Lerg et al. |
| 7,310,593 B2 | | 12/2007 | Hammerschmidt |
| 7,823,443 B2 | | 11/2010 | Djama |
| 8,854,200 B2 | | 10/2014 | Patel et al. |
| 2005/0242936 A1 | | 11/2005 | Watabe |
| 2008/0190186 A1 | | 8/2008 | Sizer et al. |

(Continued)

FOREIGN PATENT DOCUMENTS

DE    37 09 981 C2    11/1989
WO    00/36382 A2    6/2000

*Primary Examiner* — Catherine T. Rastovski
(74) *Attorney, Agent, or Firm* — Schiff Hardin LLP

(57) ABSTRACT

Sensor and method for determining operating states associated with one or more tires. The operating state of the tire can be determined based on one or more measures environmental conditions of the tire(s). For example, a controller can be configured to determine a change in one or more environmental conditions, including determining, for example, a rate-of-change value, a variance value, a standard deviation, or the like. The rate-of-change, variance, and/or standard deviation values can be compared to one or more threshold values to determine the operating state(s) associated with the tire(s). The environmental condition can include, for example, acceleration of the tire, pressure of the tire, and/or temperature of the tire. The operating state can be, for example, a filling state indicative of the tire being inflating, and/or a drive state indicative of the tire rotating about its axle.

10 Claims, 4 Drawing Sheets

(56) References Cited

U.S. PATENT DOCUMENTS

| | | |
|---|---|---|
| 2011/0105957 A1 | 5/2011 | Kourogi et al. |
| 2012/0044064 A1* | 2/2012 | Maekawa ........... B60C 23/0408 340/447 |
| 2013/0282233 A1* | 10/2013 | Hsia .................... B60C 23/0457 701/36 |
| 2016/0361958 A1 | 12/2016 | Steiner et al. |

* cited by examiner

TIRE MONITORING SYSTEM AND METHOD

CROSS-REFERENCE TO RELATED APPLICATIONS

The present application is a continuing application of U.S. patent application Ser. No. 14/739,595, filed on Jun. 15, 2015, the contents of which are incorporated herein by reference in their entirety.

BACKGROUND

Field

Embodiments described herein generally relate to tire monitoring systems and methods, including determining inflation and/or deflation states of one or more tires.

Related Art

Conventional pressure sensing systems are used for monitoring the pressure within one or more pneumatic tires of a vehicle. In general, such systems, commonly known as tire pressure monitoring systems (TPMS), include tire pressure sensors located at each tire either as part of the valve stem or in other locations, such as in the tire wall, the tread, or the tire rim.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

Figure 1:
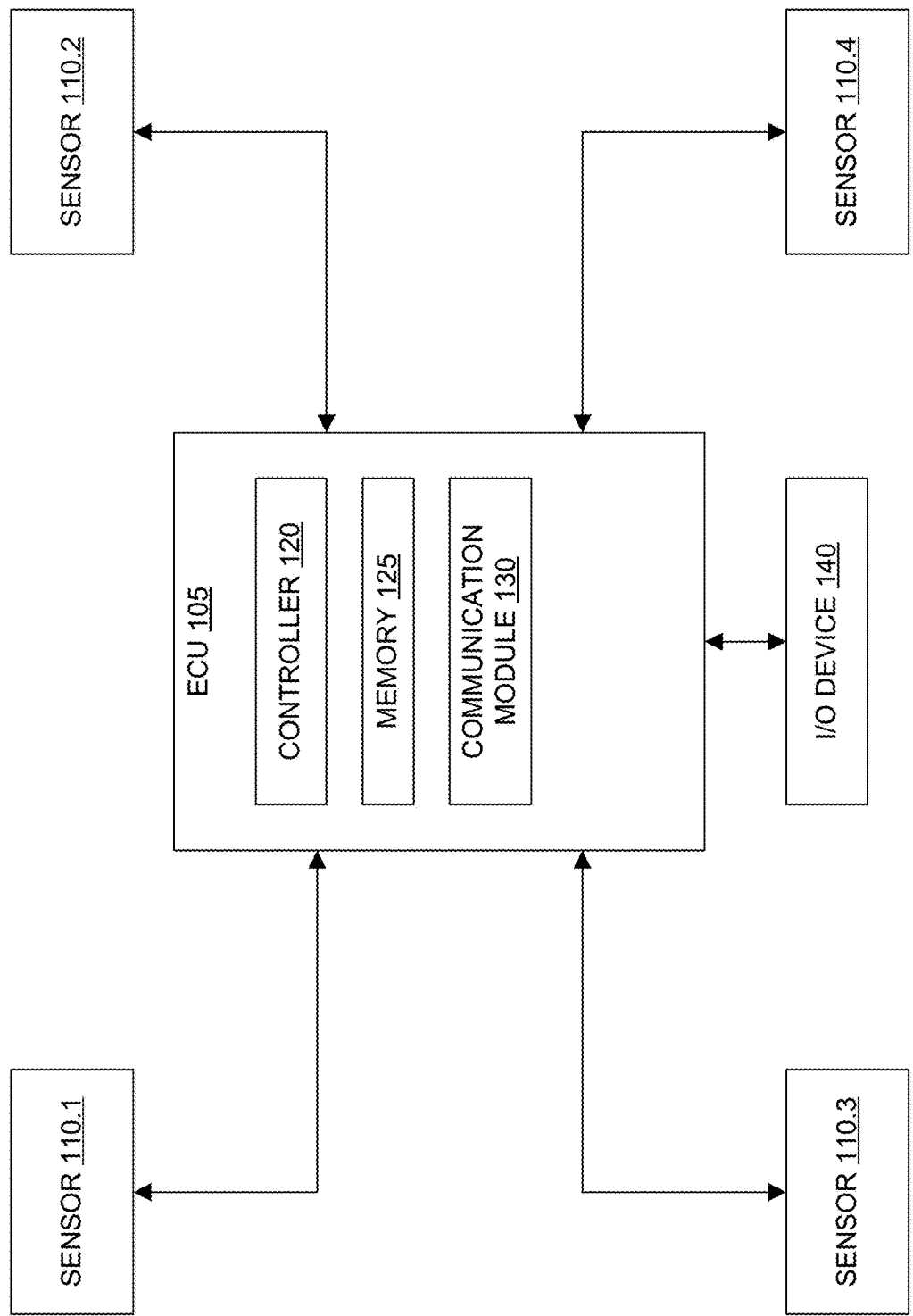
FIG. 1 illustrates a tire monitoring system according to an exemplary embodiment of the present disclosure.

FIG. 1 illustrates a tire monitoring system 100 according to an exemplary embodiment of the present disclosure.

The tire monitoring system 100 can include an electronic control unit (ECU) 105 communicatively coupled to one or more tire monitoring sensors 110.1 to 110.N (e.g. 110.1 to 110.4 as shown in FIG. 1). References to tire monitoring sensor(s) 110 includes reference to one or more of the tire monitoring sensors 110.1 to 110.N. The ECU 105 can include a controller 120, a memory 125, and a communication module 130.

The tire monitoring sensor(s) 110 can be located at a corresponding tire as part of: the valve stem, in or on the tire wall, in or on the tread, in or on the tire rim, or one or more other locations within the tire or rim, or in the proximity of the tire.

In an exemplary embodiment, the tire monitoring system 100 can include four tire monitoring sensors 110.1, 110.2, 110.3, and 110.4 corresponding to four tires of a vehicle. The tires can be pneumatic tires configured to be inflated under pressurized gas (e.g., air, nitrogen, etc.). In other embodiments, the tires can be filled with other substances, including one or more liquid substances as an alternative (or in addition) to one or more gases.

One or more of the tire monitoring sensors 110 can be configured to measure/sense one or more environmental conditions associated with a corresponding tire. For example, one or more of the tire monitoring sensors 110 can be configured to measure, for example, the pressure within the tire, the acceleration of the tire, vibration of the tire, internal and/or surface temperatures of the tire, and/or one or more other environmental conditions as would be understood by one of ordinary skill in the relevant arts. In operation, the tire monitoring sensors 110 can be configured to measure, for example, the pressure and/or acceleration of a tire, and to generate and transmit a signal to the ECU 105. In this example, the signal corresponds to one or more of the measured environmental conditions.

The ECU 105 can include controller 120, memory 125, and a communication module 130. In one or more embodiments, the ECU 105 can be communicatively coupled to one or more input/output (I/O) devices 140, including, for example, one or more displays, vehicle navigation and/or entertainment systems, speakers, horn, interior and/or exterior lights, other audio and/or visual indicator devices, and/or one or more other I/O devices as would be understood by one of ordinary skill in the relevant arts. In an exemplary embodiment, one or more windows of the vehicle can function as an output device configured to indicate one or more environmental conditions and/or operating states of one or more tires. For example, a window position can indicate a value of one or more environmental conditions of the tire(s). In operation, the window positioned at an opened position can indicate that the tire is at, for example, atmospheric pressure (1 bar) and the window at a closed position can indicate that the tire is at, for example, nominal pressure (e.g., 3.5 bar). As the tire inflates, the window can be configured to move from the opened position to the closed position based on the increasing pressure of the tire. The window position can also indicate, for example, the temperature of the tire, the acceleration, etc.

The controller 120 can include processor circuitry configured to control the overall operation of the ECU 105, including controlling the operation of one or more of the sensors 110, and/or controlling the communication with the sensor(s) 110 via the communication module 130. The controller 120 can also be configured to determine operating states of the tire monitoring system 100. In exemplary embodiments, the operating states can include, for example, a "filling" state, a "drive" state, and/or one or more other states as would be understood by one of ordinary skill in the relevant arts. For the purpose of this discussion, the filling state is active when one or more of the tires is currently being inflated or deflated. The drive state is active when one or more of the tires is rotating about its axle (i.e., the vehicle is motion).

The determination of an operating state can be based on one or more environmental conditions sensed by one or more of the tire monitoring sensors 110. In an exemplary embodiment, the ECU 105 can be configured to receive one or more signals corresponding to one or more environmental conditions from the tire monitoring sensor(s) 110. The processor circuitry 120 can be configured to process the received signal(s) and determine one or more operating states. For example, the ECU 105 can receive one or more signals from a tire monitoring sensor 110 corresponding to the pressure and/or the acceleration of the associated tire. Based on the pressure and/or the acceleration signals, the processor circuitry 120 can determine if one or more of the tires is in, for example, a filling state.

The memory 125 can store data and/or instructions that when executed by the controller 120 causes the controller 120 to perform the functions described herein. The memory 125 can be any well-known volatile and/or non-volatile memory, and can be non-removable, removable, or a combination of both.

The communication module 130 can include processor circuitry configured to communicate with one or more of the sensors 110 via one or more wireless and/or wired protocols. For example, the communication module 130 can be configured to use amplitude shift keying (ASK) modulation and/or Frequency-shift keying (FSK) modulation to communicate with one or more of the sensors 110. In an exemplary embodiment, communications can utilize the 434 MHz frequency band, the 315 MHz frequency band, and/or one or more other frequencies and/or frequency bands as would be understood by one of ordinary skill in the relevant arts. Further, the communication module 130 can be configured to transmit and/or receive data at a data rate of, for example, 20 kilobits per second (kbit/s). The data rate is not limited to this exemplary value and the data rate can be one or more other data rates as would be understood by one of ordinary skill in the relevant arts.

Figure 2:
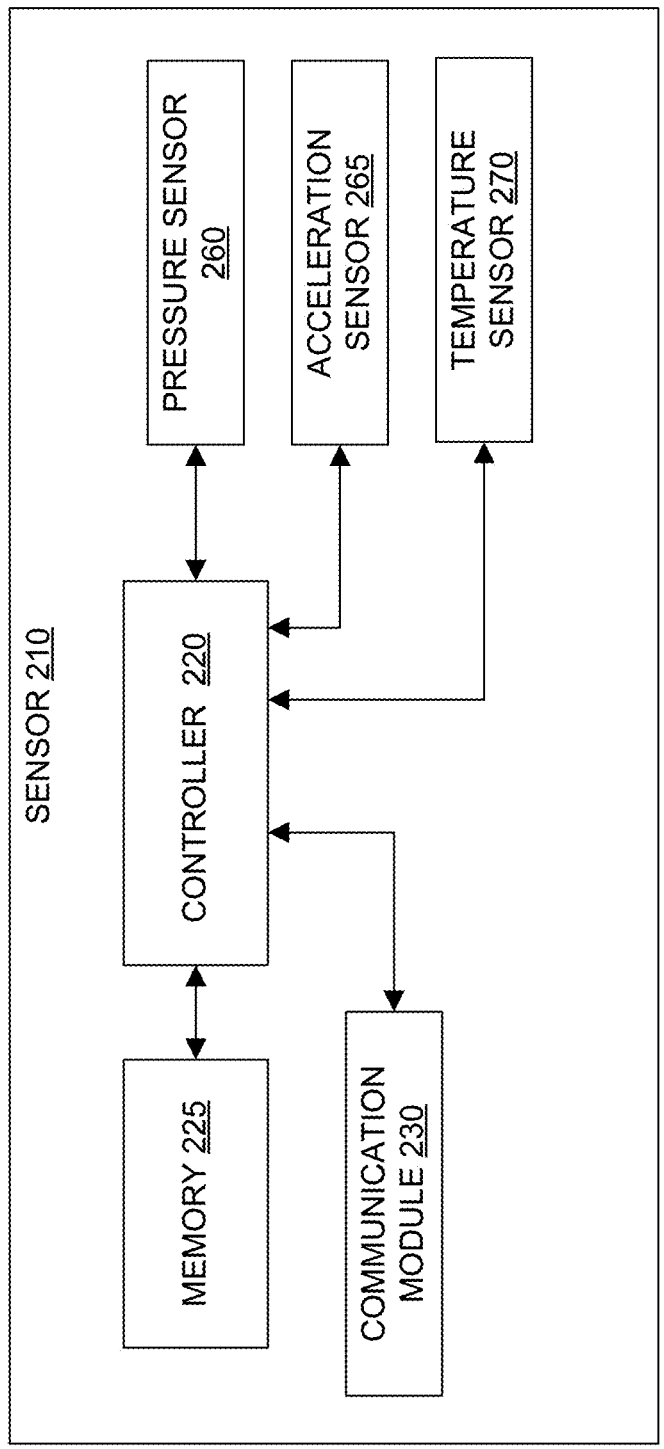
FIG. 2 illustrates a monitoring sensor according to an exemplary embodiment of the present disclosure.

FIG. 2 illustrates a tire monitoring sensor 210 according to an exemplary embodiment of the present disclosure. The tire monitoring sensor 210 can be an embodiment of one or more of the tire monitoring sensors 110 illustrated in FIG. 1.

The tire monitoring sensor 210 can include a controller 220 communicatively coupled to a memory 225, a communication module 230, and one or more sensors, including, for example, a pressure sensor 260, an acceleration sensor 265, and/or a temperature sensor 270. The tire monitoring sensor 210 can include one or more other sensor modules configured to sense other environmental conditions as would be understood by one of ordinary skill in the relevant arts. The communication links communicatively coupling the controller 220 with the other components of the sensor 210 can be wired or wireless communication links.

The pressure sensor 260 can include processor circuitry configured to measure/sense pressure within a tire associated with the tire monitoring sensor 210. For example, the pressure sensor 260 can measure the pressure within the tire relative to, for example, atmospheric pressure or a perfect vacuum. The pressure sensor 260 can be configured to generate a pressure signal that corresponds to the pressure measured by the pressure sensor 260 and to transmit the pressure signal to the controller 220.

The acceleration sensor 265 can include processor circuitry configured to measure/sense acceleration of the tire. For example, the acceleration sensor 265 can be an accelerometer configured to measure the magnitude (and also direction) of the proper acceleration (e.g., gravitational force). The acceleration sensor 265 can also be configured to sense/measure orientation, coordinate acceleration (e.g., rate of change of velocity), vibration, and/or other motion. In an exemplary embodiment, the acceleration sensor 265 can be configured to measure the vibrations generated by the flow of air (or other gases/liquids) into and/or out of the tire. For example, the acceleration sensor 265 can be configured to measure the vibrations generated by air flowing into and/or out of the tire through the valve of the tire and/or of air flowing out of the tire through one or more voids/holes (e.g., a leak) of the tire and/or rim.

The acceleration sensor 265 can be configured to generate an acceleration signal that corresponds to the acceleration measured by the acceleration sensor 265 and to transmit the acceleration signal to the controller 220.

The temperature sensor 270 can include processor circuitry configured to measure/sense internal and/or surface temperatures of the tire and/or rim. The temperature sensor 270 can be configured to generate a temperature signal that corresponds to the temperature measured by the temperature sensor 270 and to transmit the temperature signal to the controller 220.

The communication module 230 can include processor circuitry configured to communicate with one or more other sensors (e.g., other sensors 110) and/or with the ECU 105 via one or more wireless and/or wired protocols. For example, the communication module 230 can be configured to use ASK modulation and/or FSK modulation to communicate with one or more of the sensors 110 and/or the ECU 105. In an exemplary embodiment, communications can utilize the 434 MHz frequency band, the 315 MHz frequency band, and/or one or more other frequencies and/or frequency bands as would be understood by one of ordinary skill in the relevant arts. Further, the communication module 230 can be configured to transmit and/or receive data at a data rate of, for example, 20 kilobits per second (kbit/s). The data rate is not limited to this exemplary value and the data rate can be one or more other data rates as would be understood by one of ordinary skill in the relevant arts.

The controller 220 can include processor circuitry configured to control the overall operation of the sensor 210, including controlling the operation of one or more of the pressure sensor 260, the acceleration sensor 265, and/or the temperature sensor 270, and/or controlling the communication with the ECU 105 and/or one or more of the other sensors 110 via the communication module 230. The memory 225 can store data and/or instructions that when executed by the controller 220 causes the controller 220 to perform the functions described herein. The memory 225 can be any well-known volatile and/or non-volatile memory, and can be non-removable, removable, or a combination of both.

The controller 220 can be configured to control the sampling rate of the one or more of the pressure sensor 260, the acceleration sensor 265, and/or the temperature sensor 270.

The sampling rate of the pressure sensor 260 can be, for example, 100 samples per second, 10 samples per second, or another sampling rate as would be understood by one of ordinary skill in the relevant arts. The sampling rate of the acceleration sensor 265 can be, for example, 1000 samples per second, or another sampling rate as would be understood by one of ordinary skill in the relevant arts. The sampling rate of the temperature sensor 270 can be, for example, 100 samples per second, 10 samples per second, or another sampling rate as would be understood by one of ordinary skill in the relevant arts.

In a low-power mode (e.g., when the vehicle has been idle/powered off for a predetermined period of time, etc.), one or more of the sampling rates can be adjusted. For example, during a low-powered mode, the sampling rate(s) can decrease to, for example, one sample per second. This reduction in sampling rate can reduce the power consumption of the corresponding sensor.

In an exemplary embodiment, the controller 220 can be configured to determine the change between two or more measurements by a corresponding sensor (e.g., 260, 265, or 270). In an exemplary embodiment, the controller 220 can be configured to determine the rate of change (e.g., gradient, derivative, discrete time derivative) between two or more measurements by a corresponding sensor (e.g., 260, 265, or 270). The controller 220 can also be configured to determine a difference, variance, standard deviation, etc. between two or more measurements by a corresponding sensor (e.g., 260, 265, or 270). Based on the determined difference, the controller 220 can determine a difference sequence of the various measured samples. The controller 220 can also be configured to determine the average rate of change between two or more determined rate-of-change values and/or the average difference/variance between two or more determined difference/variance values. In these examples, the two or more measurements can be consecutive or non-consecutive measurements.

The controller 220 can be configured to dynamically adjust the sampling rate based on, for example, the determined rate of change between the two or more measurements by the corresponding sensor. The controller 220 can also be configured to dynamically adjust the sampling rate based on one or more other environmental conditions measured by one or more other sensors.

In operation, the controller 220 can be configured to compare the measured values from the sensor(s) to one or more threshold values and/or compare, for example, the determined rates of change and/or variance to a corresponding threshold value. Based on the comparison, the controller 220 can determine whether to adjust the sampling rate, and adjust the sampling rate accordingly.

For example, the sampling rate of the pressure sensor 260 can be adjusted (e.g., increased or decreased) based on the measured acceleration by the acceleration sensor 265. More particularly, the controller 220 can be configured to, for example, increase the sampling rate of the pressure sensor 260 based on a measured acceleration from the acceleration sensor 265.

In an exemplary embodiment, the controller 220 can be configured to determine the operating state(s) (e.g., filling state, drive state, etc.) of a tire (or tires) associated with the tire monitoring sensor 210.

The controller 220 can be configured to determine one or more operating states based on one or more environmental conditions measured by the pressure sensor 260, the acceleration sensor 265, and/or the temperature sensor 270. For example, the controller 220 can determine that the tire(s) associated with the tire monitoring sensor 210 are currently being inflated based on one or more signals received from, for example, the pressure sensor 260 and acceleration sensor 265. More particularly, the controller 220 can be configured to determine the change in pressure and/or the change in acceleration based on received pressure and/or acceleration signals.

In operation, to determine the operating state(s) of a tire associated with the tire monitoring sensor 210, the controller 220 can determine a change in pressure and/or acceleration, including a rate of change (e.g., gradient, derivative, discrete time derivative), difference, and/or variance between two or more pressure and/or acceleration measurements obtained by, for example, the pressure sensor 260 and/or acceleration sensor 265. In one or more embodiments, the variance of the signal can correspond to the energy/power of the signal. The controller 220 can determine the average rate of change between two or more (e.g., 10) determined rate-of-change values and/or the average difference and/or variance between two or more difference/variance values. The controller 220 can then compare one or more average rate-of-change values and/or average difference/variance values to one or more threshold values. Based on the comparison(s), the controller 220 can determine one or more operating states. The controller 220 can then provide the ECU 105 with the current operating state(s) via the communication module 230. In one or more embodiments, the controller 220 can be configured to determine the absolute value of the rate-of-change and/or difference/variance values. The absolute values can then be compared with one or more threshold values to determine the operating state(s).

Figure 3:
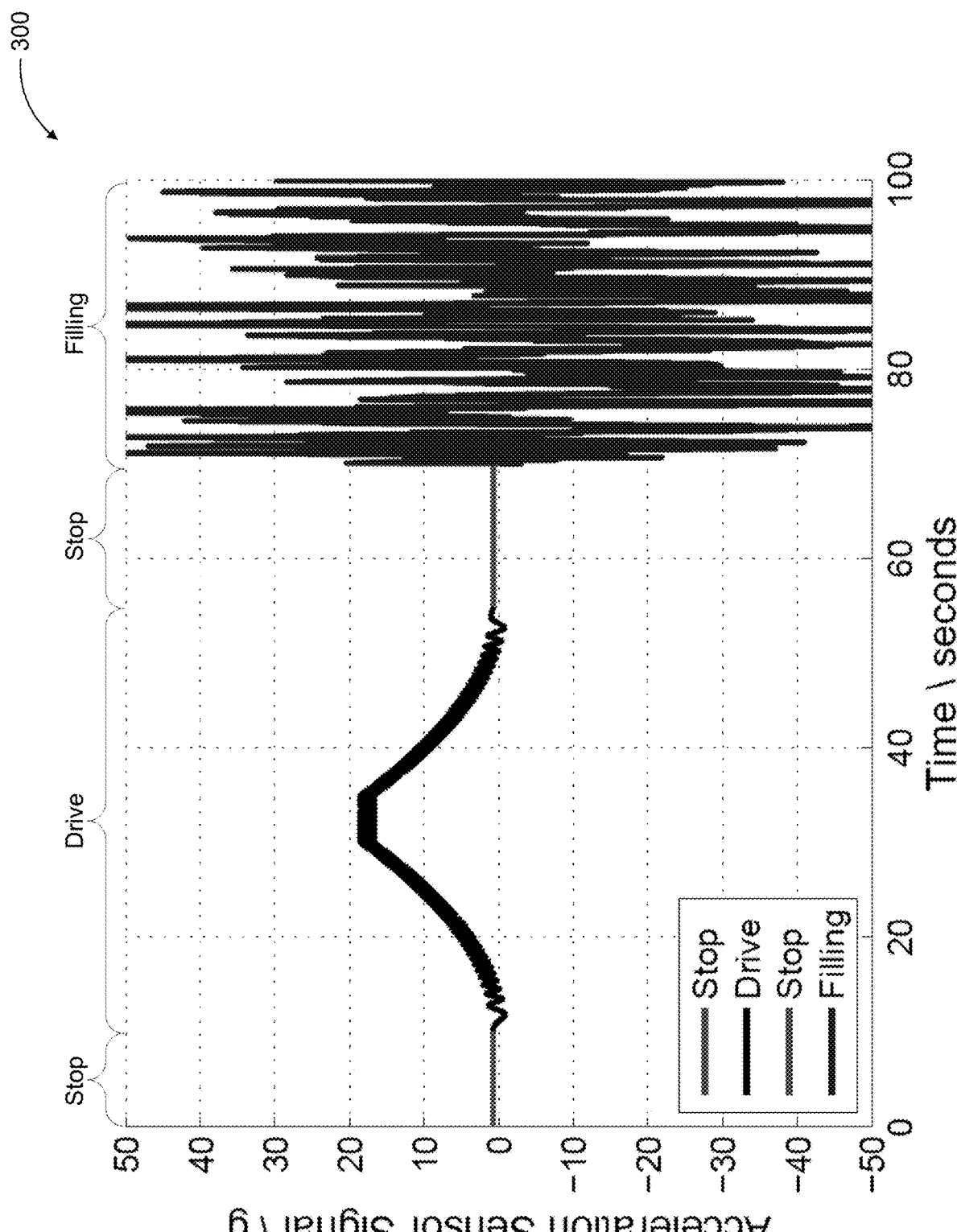
FIG. 3 illustrates an example acceleration signal according to an exemplary embodiment of the present disclosure.

In an exemplary embodiment, the acceleration sensor 265 can be configured to measure vibrations generated by the flow of air (or other gases/liquids) into and/or out of the tire. For example, air passing through the valve of the tire can cause vibrations that can be measured by the acceleration sensor 265. Based on the measured vibration(s), the acceleration sensor 265 can generate a corresponding acceleration signal as illustrated in FIG. 3. The controller 220 can then use the acceleration signal to determine the operating state (e.g., filling state) of the corresponding tire.

In this example, the vibrations can result in a generated acceleration signal that includes an increased variance and/or rate-of-change when compared to a moving (e.g., rotating) tire and/or a stationary tire not being inflated/deflated. With reference to FIG. 3, the variance and the rate-of-change of the acceleration signal are approximately constant from times t=0 to t=10. This portion of the signal can correspond to a stationary (stopped) and/or non-inflating/deflating state. From approximately t=10 to t=30, the rate-of-change of the acceleration signal increases (e.g., has a positive value) as the acceleration increases from 0 g to approximately 20 g. The acceleration remains constant from approximately t=30 to t=35 at a value of approximately 20 g. The rate-of-change of the acceleration signal then decreases (e.g., has a negative value) as the acceleration decreases from approximately 20 g to 0 g at approximately t=35 to t=55. The period from approximately t=10 to t=55 can correspond to a drive state. Here the acceleration signal increases and decreases while the rate-of-change and/or variance values of the signal are below threshold(s) indicative of a filling state. After t=55, the variance and the absolute value of the rate-of-change increase as the samples range between approximately 50 g to −50 g. Here, the variance and the absolute value of the rate-of-change are significantly larger than those during, for example, the drive state (t=10 to t=55). This portion (t≥55)

of the signal can indicate vibration caused by, for example, inflation/deflation of the tire and correspond to a filling state.

In this example, the controller 220 can compare the rate-of-change and/or variance (e.g., energy/power) values to corresponding threshold values to determine whether the vibrations measured indicate inflation/deflation of the tire to determine whether the tire is in a filling state. As described above, the controller 220 can be configured to determine average and/or absolute variance and/or rate-of-change values and compare these to corresponding thresholds. Further, the controller 220 can be configured to determine whether the tire is in a filling state using one or more environmental conditions (e.g., changes in pressure measured by pressure sensor 260) in addition to the acceleration-related values.

In another example, the pressure sensor 260 can be configured to measure pressure of the associated tire(s). Based on the measured pressure(s), the pressure sensor 260 can generate a corresponding pressure signal. The controller 220 can then use the pressure signal to determine the operating state (e.g., filling state) of the corresponding tire.

In one or more exemplary embodiments, the controller 220 can be configured to use one or more signals associated with an environmental condition in the measurement of one or more other environmental conditions and/or one or more operating state determinations. For example, the controller 220 can be configured to use a temperature signal in measuring the pressure of the corresponding tire. In this example, the temperature signal can be used to compensate for changes in pressure that may be attributable to the change in temperature.

In an exemplary embodiment, the ECU 105 and/or the monitoring sensor 210 can be configured to determine the operating state (e.g., filling state) of the tire by using two or more measured environmental conditions. For example, the controller 120 and/or 220 can be configured to determine a filling state based on acceleration signals generated by the acceleration sensor 260 and the pressure signal generated by the pressure sensor 265. In this example, the acceleration signal can be used to determine if the tire is moving and the pressure signal can be used to determine the if the tire is being inflated. That is, the acceleration signal can be used to determine a drive state, and the pressure signal can be used to determine a filling state. In this example, the controller 120 and/or 220 can be configured to only determine a filling state using the pressure signal if the acceleration signal indicates that the tire is not in a driving state. That is, if the controller 120 and/or 220 determine that the tire is being inflated (based on the pressure change) and that the tire is not moving (based on the acceleration), the controller 120 and/or 220 can determine that the tire is in a filling state.

As described above, instead of monitoring sensor 210 determining the operating state(s) of a corresponding tire, the monitoring sensor 210 can be configured to provide one or more signals representing measured environmental conditions to the ECU 105, and the ECU 105 can be configured to determine rate of change (e.g., gradient, derivative, discrete time derivative), variance, standard deviation, and/or a difference between two or more measurements. Based on the rate of change and/or difference/variance determinations, the ECU 105 can be configured to determine the operating state of a tire from a corresponding sensor 210.

For example, the determination of an operating state can be based on one or more environmental conditions sensed by one or more of the tire monitoring sensors 110. In an exemplary embodiment, the ECU 105 can be configured to receive one or more signals corresponding to one or more environmental conditions from the tire monitoring sensor(s) 110. The processor circuitry 120 can be configured to process the received signal(s) and determine one or more operating states. For example, the ECU 105 can receive one or more signals from a tire monitoring sensor 110 corresponding to the pressure and/or the acceleration of the associated tire. Based on the pressure and/or the acceleration signals, the processor circuitry 120 can determine if one or more of tires is in, for example, a filling state.

In other embodiments, the monitoring sensor 210 can determine the rate of change (e.g., gradient, derivative, discrete time derivative), a variance, and/or a difference between two or more measurements. In this example, the monitoring sensor 210 can be configured to provide these determinations to the ECU 105, and the ECU 105 can be configured to determine the operating state of a corresponding sensor based on the rate-of-change/variance determinations provided by the monitoring sensor 210. For example, the ECU 105 can compare the received rate-of-change/variance determinations to a corresponding threshold values to determine the operating state.

Figure 4:
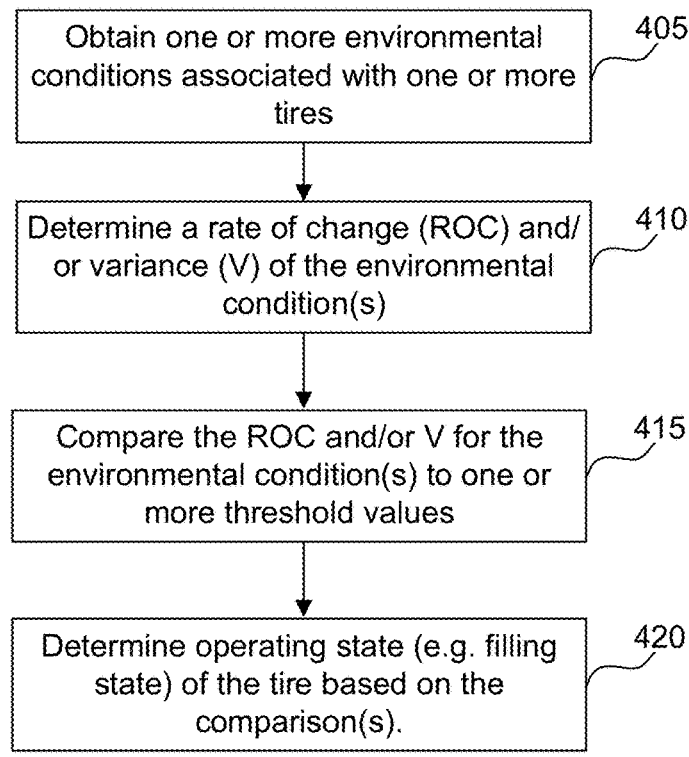
FIG. 4 illustrates a method for determining an operating state according to an exemplary embodiment of the present disclosure.

FIG. 4 illustrates a flowchart 400 of a communication network mode selection method in accordance with an exemplary embodiment of the present disclosure. The method of flowchart 400 is described with continued reference to FIGS. 1-3. The steps of the method of flowchart 400 are not limited to the order described below, and the various steps may be performed in a different order. Further, two or more steps of the method of flowchart 400 may be performed simultaneously with each other.

The method of flowchart 400 begins at step 405, where one or more environmental conditions are obtained for one or more associated tires. For example, the pressure sensor 260, acceleration sensor 265, and/or temperature sensor 270 can measure corresponding environmental conditions associated with a corresponding tire.

After step 405, the flowchart 400 transitions to step 410, where a rate-of-change value and/or a variance value is determined for the obtained environmental condition(s).

In embodiments where the pressure sensor 260, acceleration sensor 265, and/or temperature sensor 270 generate pressure, acceleration, and/or temperature signals, respectively, and provide the signal(s) to the ECU 105, the ECU 105 can be configured to determine rate-of-change values and/or variance values based on the received signals. Further, the ECU 105 can be configured to determine average rate-of-change values and/or variance values, and/or absolute rate-of-change values and/or variance values. In other embodiments, the monitoring sensor 210 can be configured to determine rate-of-change values and/or variance values, including average and/or absolute values, based on the measured environmental condition(s).

After step 410, the flowchart 400 transitions to step 415, where the determined rate-of-change and/or variance value(s) are compared to one or more corresponding threshold values.

For example, the ECU 105 can be configured to compare rate-of-change values and/or variance values to one or more threshold values. In other examples, the monitoring sensor 210 can be configured to perform the comparison and use the results in subsequent processing and/or provide the results to the ECU 105 for subsequent processing by the ECU 105.

After step 415, the flowchart 400 transitions to step 420, where the operating state of the associated tire(s) is determined based on the comparison(s).

For example, the ECU 105 can be configured to determine the operating state (e.g., a filling state) based on the comparison of the rate-of-change values and/or variance values to the one or more threshold values. In other examples, the monitoring sensor 210 can be configured to perform the determination and to provide the determination to the ECU 105 for subsequent processing.

The various exemplary embodiments described herein are described and illustrated within a tire monitoring environment, and are configured to monitor environmental conditions (e.g., pressure, acceleration, temperature, etc.) of a tire. However, it should be appreciated that the sensors 110 and the ECU 105 can be configured to monitor one or more environmental conditions of other inflatable devices as would be understood by one of ordinary skill in the relevant arts.

The techniques of this disclosure may also be described in the following examples.

Example 1

A monitoring sensor, comprising: a sensor configured to generate a signal indicative of (i) a rotation or a non-rotation of a tire, and (ii) a gas-flow produced vibration of the tire; and a controller configured to, based on the signal, (i) identify a non-rotation condition of the tire, and (ii) determine a variance of the gas-flow produced vibration, wherein the controller is further configured to, when the non-rotation condition of the tire is identified, compare the variance of the gas-flow produced vibration to a threshold value to determine a filling state of the tire.

Example 2

The monitoring sensor of Example 1, wherein the sensor is an acceleration sensor configured to measure an acceleration associated with the gas-flow produced vibration of the tire that is caused by gas entering or exiting the tire.

Example 3

The monitoring sensor of any combination of Examples 1-2, wherein the sensor is an acceleration sensor configured to measure an acceleration of the tire, and wherein the signal is an acceleration signal that indicates the acceleration of the tire measured by the acceleration sensor.

Example 4

The monitoring sensor of any combination of Examples 1-3, wherein the sensor is configured to measure the gas-flow produced vibration as a result of gas entering or exiting the tire, and wherein the controller is configured to determine the filling state of the tire based on the gas-flow produced vibration that is the result of the gas entering or exiting the tire.

Example 5

The monitoring sensor of any combination of Examples 1-4, wherein the controller is configured to determine a variance value associated with the gas-flow produced vibration, and to compare the variance value of the gas-flow produced vibration to the threshold value to determine the filling state of the tire.

Example 6

The monitoring sensor of any combination of Examples 1-5, wherein the controller is configured to determine the variance value of the gas-flow produced vibration based on values between two or more measurements taken by the sensor as indicated by the signal, and wherein the threshold value defines a maximum range of variance values associated with the gas-flow produced vibration.

Example 7

A monitoring method, comprising: generating a signal indicative of (i) a rotation or a non-rotation of a tire, and (ii) a gas-flow produced vibration of the tire; identifying a non-rotation condition of the tire based on the signal; determining a variance of the gas-flow produced vibration based on the signal; and when the non-rotation condition of the tire is identified, determining a filling state of the tire by comparing the variance of the gas-flow produced vibration to a threshold value.

Example 8

The monitoring method of Example 7, wherein the act of generating the signal comprises generating an acceleration signal that is indicative of an acceleration associated with the gas-flow produced vibration of the tire that is caused by gas entering or exiting the tire.

Example 9

The monitoring method of any combination of Examples 7-8, wherein the act of determining the filling state of the tire includes determining the filling state of the tire by measuring the gas-flow produced vibration of the tire that is caused by gas entering or exiting the tire.

Example 10

The monitoring method of any combination of Examples 7-9, wherein the act of determining the variance of the gas-flow produced vibration comprises determining a variance value associated with the gas-flow produced vibration based on values between two or more measurements taken by the sensor as indicated by the signal, wherein the act of comparing the variance of the gas-flow produced vibration to the threshold value comprises comparing the variance value to the threshold value, and wherein the threshold value defines a maximum range of variance values associated with the gas-flow produced vibration.

Example 11

A monitoring sensor, comprising: a pressure sensor configured to generate a pressure signal indicative of a tire pressure; and a controller configured to determine a rate of change value of the tire pressure based on the pressure signal, and to compare the determined rate of change value to a threshold value to determine a filling state of the tire.

Example 12

The monitoring sensor of Example 11, further comprising: an acceleration sensor configured to generate an acceleration signal indicative of an acceleration of the tire, and wherein the controller is further configured to adjust a sampling rate of the pressure sensor based on the acceleration signal.

Example 13

The monitoring sensor of any combination of Examples 11-12, further comprising: a temperature sensor configured to generate a temperature signal indicative of a temperature of the tire, and wherein the controller is further configured to compensate for changes in the tire pressure as measured by the pressure sensor using the temperature signal.

Example 14

The monitoring sensor of any combination of Examples 11-13, further comprising: an acceleration sensor configured to generate an acceleration signal indicative of an acceleration of the tire, and wherein the controller is further configured to determine the filling state of the tire using only the pressure signal when the acceleration signal indicates that the tire is in a non-rotating state.

Example 15

The monitoring sensor of any combination of Examples 11-14, wherein the controller is further configured to determine the filling state of the tire as being inflated when (i) the pressure signal indicates pressure changes, and (ii) the acceleration signal indicates that the tire is in a non-rotating state.

Example 16

The monitoring sensor of any combination of Examples 11-15, wherein the controller is configured to determine the rate of change value of the tire pressure based on values between two or more measurements taken by the pressure sensor as indicated by the pressure signal, and wherein the threshold value defines a maximum range of rate of change values associated with the tire pressure.

Example 17

A monitoring method, comprising: generating a pressure signal indicative of a tire pressure; determining a rate of change value of the tire pressure based on the pressure signal; and determining a filling state of the tire by comparing the determined rate of change value to a threshold value.

Example 18

The monitoring method of Example 17, wherein the pressure signal is generated by a pressure sensor, and further comprising: generating an acceleration signal indicative of an acceleration of the tire; and adjusting a sampling rate of the pressure sensor based on the acceleration signal.

Example 19

The monitoring method of any combination of Examples 17-18, wherein the pressure signal is generated by a pressure sensor, and further comprising: generating a temperature signal indicative of a temperature of the tire; and compensating for changes in the tire pressure as measured by the pressure sensor using the temperature signal.

Example 20

The monitoring method of any combination of Examples 17-19, further comprising: generating an acceleration signal indicative of an acceleration of the tire; and determining the filling state of the tire as being inflated when (i) the pressure signal indicates pressure changes, and (ii) the acceleration signal indicates that the tire is in a non-rotating state.

Conclusion

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The term "module" shall be understood to include one of software, firmware, hardware (such as circuits, microchips, processors, or devices, or any combination thereof), or any combination thereof. In addition, it will be understood that each module can include one or more components within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

What is claimed is:

1. A monitoring sensor, comprising:
   a pressure sensor configured to generate a pressure signal indicative of a tire pressure of a tire;
   an acceleration sensor configured to generate an acceleration signal indicative of an acceleration of the tire over time; and
   a controller configured to:
     determine a rate of change value of the tire pressure based on the pressure signal,
     determine a rate of change value between two or more acceleration measurements performed by the acceleration sensor based on the acceleration signal,
     adjust a sampling rate of the pressure sensor based on the determined rate of change value of the acceleration of the tire; and
     compare the determined rate of change value of the tire pressure to a threshold value to determine a filling state of the tire.

2. The monitoring sensor of claim 1, further comprising:
   a temperature sensor configured to generate a temperature signal indicative of a temperature of the tire, and
   wherein the controller is further configured to compensate for changes in the tire pressure as measured by the pressure sensor using the temperature signal.

3. The monitoring sensor of claim 1,
   wherein the controller is further configured to determine the filling state of the tire using only the pressure signal when the acceleration signal indicates that the tire is in a non-rotating state.

4. The monitoring sensor of claim 1,
   wherein the controller is further configured to determine the filling state of the tire as being inflated when (i) the rate of change value of the tire pressure exceeds the threshold value, and (ii) the acceleration signal indicates that the tire is in a non-rotating state.

5. The monitoring sensor of claim 1, wherein the controller is configured to determine the rate of change value of the tire pressure based on values between two or more measurements taken by the pressure sensor as indicated by the pressure signal.

6. A monitoring method, comprising:
   generating a pressure signal indicative of a tire pressure of a tire;
   generating an acceleration signal indicative of an acceleration of the tire over time;
   determining a rate of change value of the tire pressure based on the pressure signal;
   determining a rate of change value between two or more acceleration measurements performed by the acceleration sensor based on the acceleration signal;
   adjusting a sampling rate of the pressure sensor based on the determined rate of change value of the acceleration of the tire; and
   determining a filling state of the tire by comparing the determined rate of change value of the tire pressure to a threshold value.

7. The monitoring method of claim 6, wherein the pressure signal is generated by a pressure sensor, and further comprising:
   generating a temperature signal indicative of a temperature of the tire; and
   compensating for changes in the tire pressure as measured by the pressure sensor using the temperature signal.

8. The monitoring method of 6, further comprising:
   determining the filling state of the tire as being inflated when (i) the rate of change value of the tire pressure exceeds the threshold value, and (ii) the acceleration signal indicates that the tire is in a non-rotating state.

9. The monitoring sensor of claim 1, wherein the acceleration signal is indicative of a rotational state of the tire and a gas-flow produced vibration of the tire.

10. The monitoring sensor of claim 1, wherein the controller is further configured to determine an average rate of change of the tire pressure between two or more rate of change values of the tire pressure based on the pressure signal, and to compare the determined average rate of change value of the tire pressure to the threshold value to determine the filling state of the tire.

* * * * *